US012782550B2

(12) United States Patent
Rokkam et al.

(10) Patent No.: US 12,782,550 B2
(45) Date of Patent: Nov. 3, 2026

(54) DICTIONARY BASED TEMPORALLY COMPRESSED SYNTHETIC APERTURE RADAR IMAGE RECONSTRUCTION

(71) Applicant: Tata Consultancy Services Limited, Mumbai (IN)

(72) Inventors: Krishna Kanth Rokkam, Bangalore (IN); Andrew Gigie, Bangalore (IN); Aditi Kuchibhotla, Bangalore (IN); Achanna Anil Kumar, Bangalore (IN); Tapas Chakravarty, Kolkata (IN); Balamuralidhar Purushothaman, Bangalore (IN); Pavan Kumar Reddy Kancham, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 385 days.

(21) Appl. No.: 18/346,500

(22) Filed: Jul. 3, 2023

(65) Prior Publication Data

US 2024/0077604 A1 Mar. 7, 2024

(30) Foreign Application Priority Data

Sep. 7, 2022 (IN) ............................ 202221051187

(51) Int. Cl.
*G01S 13/90* (2006.01)
*G06V 10/25* (2022.01)

(52) U.S. Cl.
CPC .......... *G01S 13/9004* (2019.05); *G06V 10/25* (2022.01)

(58) Field of Classification Search
CPC ....... G01S 13/9004; G06V 10/25; G06T 9/00; H04N 19/132; H04N 19/167; H04N 19/17
See application file for complete search history.

(56) References Cited

U.S. PATENT DOCUMENTS 8,861,588 B2 10/2014 Nguyen et al.
10,367,674 B2 7/2019 Bolstad et al.
(Continued)

FOREIGN PATENT DOCUMENTS

CN 105242255 A * 1/2016 .............. G01S 7/411
CN 113030880 A * 6/2021 ............... G01S 7/41
CN 114966687 A * 8/2022 ......... G01S 13/9004

OTHER PUBLICATIONS

Enhanced compressed sensing autofocus for high-resolution airborne synthetic aperture radar, Mojtaba Beheshti, Jul. 2022,Digital Signal Processing vol. 127 (Year: 2022).*
(Continued)

*Primary Examiner* — Jack W Keith
*Assistant Examiner* — Clayton Paul Ridder
(74) *Attorney, Agent, or Firm* — Finnegan, Henderson, Farabow, Garrett & Dunner LLP

(57) ABSTRACT

This disclosure relates generally to Synthetic Aperture Radar (SAR) reconstruction and finds wide application in remote sensing. Conventional approaches either involve huge computational requirement for processing or require specialized hardware along with many additional Radio Frequency (RF) components. The present disclosure provides two approaches for temporally sampling a received pulse compressed signal at two sub-sampling factors, wherein both methods involve frugal hardware implementation. Reconstruction approach of the art is based on the principle of difference ruler and is not suitable for SAR image reconstruction due to the large measurements and image dimensions. In accordance with the present disclosure, the reconstruction problem is framed as an inverse imaging problem by suitably using a forward model and employing an approach like Alternating Direction Method of Multipliers
(Continued)

(ADMM) for solving this model which allows use of readily available Plug and Play (PnP) priors.

12 Claims, 12 Drawing Sheets

(56) References Cited

U.S. PATENT DOCUMENTS

| | | | | |
|---|---|---|---|---|
| 2020/0284900 | A1* | 9/2020 | Mansour | G01S 13/90 |
| 2021/0132215 | A1* | 5/2021 | Wu | G01S 13/931 |
| 2022/0120851 | A1* | 4/2022 | Prager | G01S 13/0209 |

OTHER PUBLICATIONS

Yijiu Zhao et al., "Sparse Multiband Signal Acquisition Receiver With Co-Prime Sampling," IEEE Access, Apr. 2018, vol. 6, pp. 25261-25269, IEEE, https://ieeexplore.ieee.org/stamp/stamp.jsp?arnumber=8345572.

* cited by examiner

DICTIONARY BASED TEMPORALLY COMPRESSED SYNTHETIC APERTURE RADAR IMAGE RECONSTRUCTION

PRIORITY CLAIM

This U.S. patent application claims priority under 35 U.S.C. § 119 to: India Application No. 202221051187, filed on 7 Sep. 2022. The entire contents of the aforementioned application are incorporated herein by reference.

TECHNICAL FIELD

The disclosure herein generally relates to the field of satellite imaging, and, more particularly, to systems and methods for dictionary based temporally compressed synthetic aperture radar image reconstruction.

BACKGROUND

Synthetic Aperture Radar (SAR) is an active imaging radar system that is widely used in the field of remote sensing. Electromagnetic waves are illuminated from a transmitter which is mounted on a moving platform and back scattered echoes or signals are captured at different positions for subsequent image reconstruction. Further, SAR is an all-weather friendly imaging paradigm that can provide images under all conditions as opposed to optical systems. Due to this inherent advantage, it finds usage in wide range of applications ranging from infrastructure monitoring, environment monitoring, surveillance, oil spill detection, and the like.

A high-resolution SAR imaging system requires more bandwidth and a larger synthetic aperture. On board storage, computing and downlink transmission of data is thus a major bottleneck in such high-resolution SAR systems. Hence, compression techniques are needed to efficiently compress the acquired raw data that can also guarantee robust reconstruction. Acquiring raw data at high sampling rate with wider synthetic aperture and transmitting the compressed SAR image after on-board reconstruction involves huge computational requirement for processing and is often not practical. Compressive Sensing (CS) based compression can be applied in both spatial and range dimensions. Spatial CS can easily be realized by sampling at different random spatial locations, while range CS comes in the scope of analog sub-Nyquist samplers. The state-of-art approaches provide reconstruction with compressed measurements, but it would require chipping sequence at Nyquist sampling rate, thereby requiring specialized hardware along with many additional RF components.

SUMMARY

Embodiments of the present disclosure present technological improvements as solutions to one or more of the above-mentioned technical problems recognized by the inventors in conventional systems.

In an aspect, there is provided a processor implemented method comprising: receiving via a radar, a back scattered signal from a region of interest for imaging; mixing, via one or more hardware processors, the received back scattered signal with a reference signal to obtain a pulse compressed signal, wherein the reference signal is a conjugate of a transmitted signal by the radar; temporally sampling, via the one or more hardware processors, the pulse compressed signal at two sub-sampling factors, to obtain temporally compressed sampled signals, a signal from each of the two sub-sampling factors, wherein the temporally sampling comprises one of: sub-Nyquist sampling using the two sub-sampling factors ($d_1$ and $d_2$) which are co-primes; and delaying the pulse compressed signal at one of the two sub-sampling factors and performing the sub-Nyquist sampling, using a sub-sampling factor $d_3$, on (i) the delayed pulse compressed signal, wherein an associated delay factor ($C_1$) is not a multiple of the sub-sampling factor $d_3$ and (ii) the pulse compressed signal; constructing, via the one or more hardware processors, a dictionary H based on the temporally compressed sampled signals; formulating, via the one or more hardware processors, an optimization problem comprising the temporally compressed sampled signals, the constructed dictionary and a regularizer; estimating, via the one or more hardware processors, a plurality of reflectivity coefficients of the region of interest by solving the formulated optimization problem; and imaging, via the one or more hardware processors, the region of interest by reconstructing a Synthetic Aperture Radar (SAR) image thereof, based on the temporally compressed sampled signals, using the estimated plurality of reflectivity coefficients.

In another aspect, there is provided a system comprising a memory storing instructions; one or more communication interfaces; and one or more hardware processors coupled to the memory via the one or more communication interfaces, wherein the one or more hardware processors are configured by the instructions to: receive via a radar, a back scattered signal from a region of interest for imaging; mix, the received back scattered signal with a reference signal to obtain a pulse compressed signal, wherein the reference signal is a conjugate of a transmitted signal by the radar; temporally sample, the pulse compressed signal at two sub-sampling factors, to obtain temporally compressed sampled signals, a signal from each of the two sub-sampling factors, wherein the temporally sampling comprises one of: sub-Nyquist sampling using the two sub-sampling factors ($d_1$ and $d_2$) which are co-primes; and delaying the pulse compressed signal at one of the two sub-sampling factors and performing the sub-Nyquist sampling, using a sub-sampling factor $d_3$, on (i) the delayed pulse compressed signal, wherein an associated delay factor ($C_1$) is not a multiple of the sub-sampling factor $d_3$ and (ii) the pulse compressed signal; construct, a dictionary based on the temporally compressed sampled signals; formulate, an optimization problem comprising the temporally compressed sampled signals, the constructed dictionary and a regularizer; estimate, a plurality of reflectivity coefficients of the region of interest by solving the formulated optimization problem; and image, the region of interest by reconstructing a Synthetic Aperture Radar (SAR) image thereof, based on the temporally compressed sampled signals, using the estimated plurality of reflectivity coefficients.

In yet another aspect, there is provided one or more non-transitory machine-readable information storage mediums comprising one or more instructions which when executed by one or more hardware processors cause: receiving via a radar, a back scattered signal from a region of interest for imaging; mixing, via one or more hardware processors, the received back scattered signal with a reference signal to obtain a pulse compressed signal, wherein the reference signal is a conjugate of a transmitted signal by the radar; temporally sampling, via the one or more hardware processors, the pulse compressed signal at two sub-sampling factors, to obtain temporally compressed sampled signals, a signal from each of the two sub-sampling factors, wherein the temporally sampling comprises one of: sub-Nyquist sampling using two sub-sampling factors ($d_1$ and $d_2$) which are co-primes; and delaying the pulse compressed signal at one of the two sub-sampling factors and performing the sub-Nyquist sampling, using a sub-sampling factor $d_3$, on (i) the delayed pulse compressed signal, wherein an associated delay factor ($C_1$) is not a multiple of the sub-sampling factor $d_3$ and (ii) the pulse compressed signal; constructing, via the one or more hardware processors, a dictionary H based on the temporally compressed sampled signals; formulating, via the one or more hardware processors, an optimization problem comprising the temporally compressed sampled signals, the constructed dictionary and a regularizer; estimating, via the one or more hardware processors, a plurality of reflectivity coefficients of the region of interest by solving the formulated optimization problem; and imaging, via the one or more hardware processors, the region of interest by reconstructing a Synthetic Aperture Radar (SAR) image thereof, based on the temporally compressed sampled signals, using the estimated plurality of reflectivity coefficients.

In accordance with an embodiment of the present disclosure, the one or more hardware processors are configured to construct a dictionary based on the sampled signals by one of (i) a union of measurement matrices $H_{d_1}$ and $H_{d_2}$ corresponding to the two sub-sampling factors $d_1$ and $d_2$ respectively and (ii) a union of measurement matrices $H_{d_3}$ and $H_{d_{3\text{-}delayed}}$ corresponding to the sub-sampling factor $d_3$ on the pulse compressed signal and the delayed pulse compressed signal respectively; wherein each atom of the dictionary H is computed based on a time delay.

In accordance with an embodiment of the present disclosure, the formulated optimization problem is represented as:

$$\hat{\rho} = \underset{\rho}{\operatorname{argmin}} |r^{comp} - H\rho|_2 + \lambda R(\rho)$$

where R(ρ) is the regularizer on the plurality of reflectivity coefficients ρ, λ is a penalty term which controls the amount of regularization and $r^{comp}$=vec{r}, where r is a collection of temporally compressed sampled signals.

In accordance with an embodiment of the present disclosure, the formulated optimization problem is solved using an Alternating Direction Method of Multipliers (ADMM).

In accordance with an embodiment of the present disclosure, the radar is Frequency Modulated Continuous Wave (FMCW) radar.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
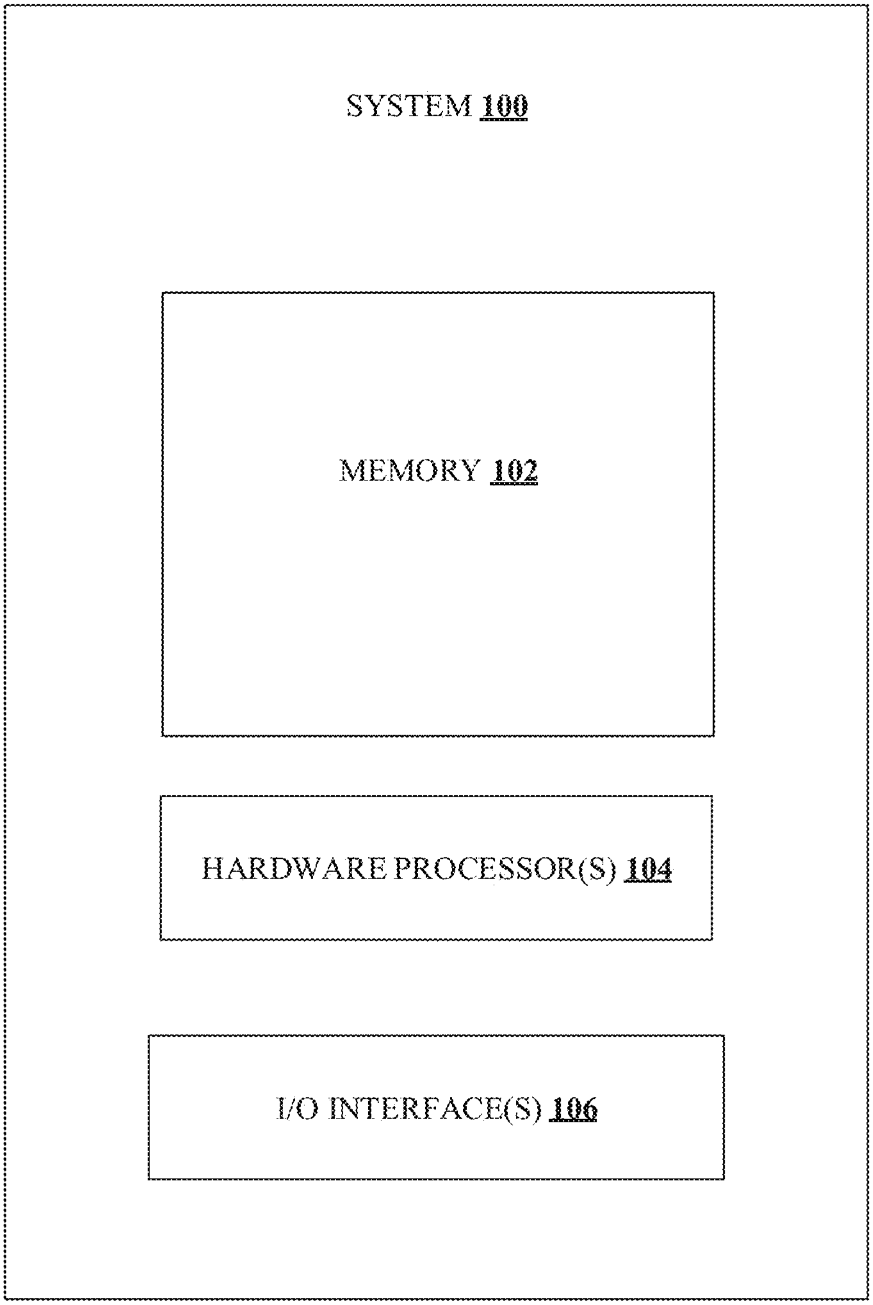
FIG. 1 illustrates an exemplary block diagram of a system for dictionary based temporally compressed Synthetic Aperture Radar (SAR) image reconstruction, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Synthetic Aperture Radar (SAR) is an active imaging radar system that finds wide application in remote sensing for infrastructure monitoring, environment monitoring, surveillance, oil spill detection, and the like. A high-resolution SAR imaging system requires more bandwidth and a larger synthetic aperture. On board storage, computing and downlink transmission of data is thus a major bottleneck in such high-resolution SAR systems. Hence, compression techniques are needed to efficiently compress the acquired raw data that can also guarantee robust reconstruction. Conventional approaches either involve huge computational requirement for processing or require specialized hardware along with many additional Radio Frequency (RF) components.

Frequency Modulated Continuous Wave (FMCW) based radars are increasingly being considered for low to midrange SAR imaging due to its power efficiency and better pulse compression. Accordingly, the method and system of the present disclosure uses the FMCW radars for simulation and experimental analysis. For ease of explanation, the present disclosure refers to a sub-Nyquist range compression scheme for SAR as Compressed Coprime Frequency Modulated Continuous Wave SAR (CCF-SAR). However, it will be understood by those skilled in the art, that the method and system of the present disclosure are not limited to the use of FMCW radars alone.

The present disclosure provides two approaches for temporally sampling the pulse compressed signal at two sub-sampling factors, wherein both methods involve frugal hardware implementation. Reconstruction approach of the art is based on the principle of difference ruler and is not suitable for SAR image reconstruction due to the large measurements and image dimensions. In accordance with the present disclosure, the reconstruction problem is framed as an inverse imaging problem by suitably using a forward model and employing an approach like Alternating Direction Method of Multipliers (ADMM) for solving this model which allows use of readily available Plug and Play (PnP) priors.

Referring now to the drawings, and more particularly to FIG. 1 through FIG. 7F, where similar reference characters denote corresponding features consistently throughout the figures, there are shown preferred embodiments and these embodiments are described in the context of the following exemplary system and/or method.

FIG. 1 illustrates an exemplary block diagram of a system for dictionary based temporally compressed Synthetic Aperture Radar (SAR) image reconstruction, in accordance with some embodiments of the present disclosure. In an embodiment, the system 100 includes one or more hardware processors 104, communication interface (s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The communication interface (s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

For ease of explanation, an FMCW signal model is explained herein, as an exemplary radar to be utilized in the method and system of the present disclosure. Equation (1) below is a representation of a transmitted signal by the FMCW Radar which is a chirp signal, in which the frequency increases or decreases with reference to time.

$$s(t)=e^{i(\omega_0 t+\alpha t^2)} \rightarrow \tag{1}$$

where $\omega_0$ denotes the carrier frequency, chirp rate $\alpha$=B/TP, B and TP denote the chirp bandwidth and a time period respectively.

In SAR imaging, the radar collects measurements at different positions. Once the data acquisition is done, then the data collected from each SAR position is combined to form a better quality SAR image. Equation (2) below represents a received signal acquired at $k^{th}$ position, $k=\{1, 2, \ldots, K\}$, where K denotes the number of observations.

$$\tilde{r}_k(t)=\int\rho(x)s(t-\tau(x))dx \rightarrow \tag{2}$$

where x represents a region of interest for imaging and $\rho(\bullet)$ represents an associated reflectivity coefficient. $\tau(x)$ is the delay represented as 2R(x)/c, where R(•) represents a range of distance from the radar to the region of interest and c is propagation velocity of light.

The received signal is first deramped by mixing it with s*(t), reference (conjugate of transmitted) signal, which is expressed in the form of Equation (3) provided below.

$$r_k(t)=\tilde{r}_k(t)s^*(t)=\int\rho(x)s(t-\tau(x))s^*(t)dx+\eta_k(t)\rightarrow \quad (3)$$

where $\eta_k$(t) denotes an additive white Gaussian noise.

By using the transmitted signal of Equation (1) in Equation (3), an intermediate frequency (IF) signal as shown in Equation (4) below is obtained.

$$r_k(t)=\int\rho(x)e^{-i(\omega_0\tau(x)+2\alpha t\tau(x)-\alpha\tau(x)^2)}dx+\eta_k(t)\rightarrow \quad (4)$$

The scene to be imaged and represented by x, the region of interest is discretized into smaller cells, say into L cells, $\{x_1, x_2, \ldots, x_L\}$. The Equation (4) is then expressed as Equation (5) given below.

$$r_k(t)=\sum_{l=1}^{L}\rho(x_l)e^{-i(\omega_0\tau(x_l)+2\alpha t\tau(x_l)-\alpha\tau(x_l)^2)}+\eta_k(t)\rightarrow (5)$$

The Compressive Sensing (CS) based architectures known in the art are multi-channel architectures and require pulse spreading functions whose chipping rate must be at Nyquist sampling rate. Hence, the existing state-of-art CS based SAR compression schemes are hardware intensive. The present disclosure provides simple yet efficient approaches for compressed acquisition of $r_k$(t).

Figure 2A:
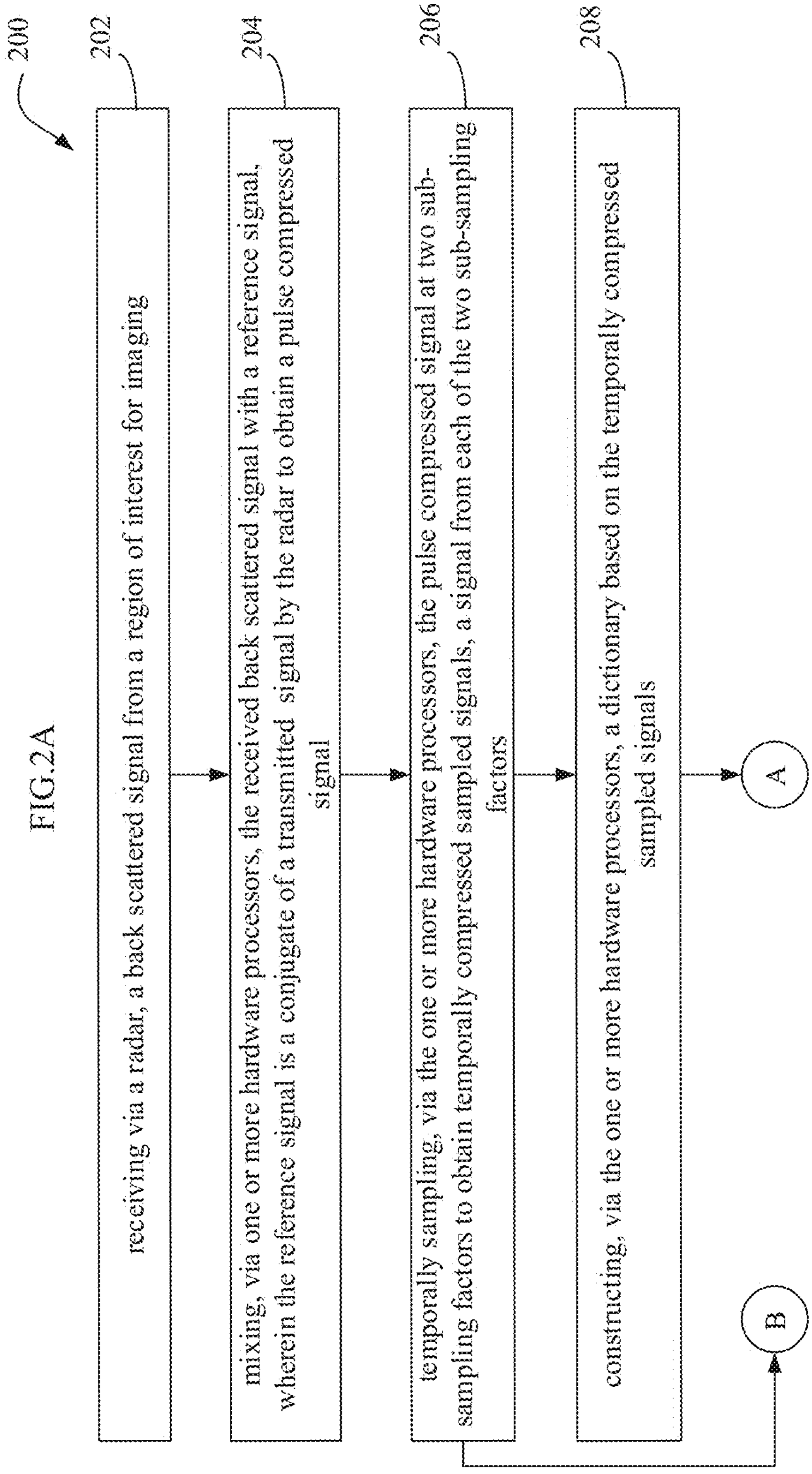
FIGS. 2A, 2B, and 2C illustrate an exemplary flow diagram of a computer implemented method for dictionary based temporally compressed SAR image reconstruction, in accordance with some embodiments of the present disclosure.
Figure 2B:
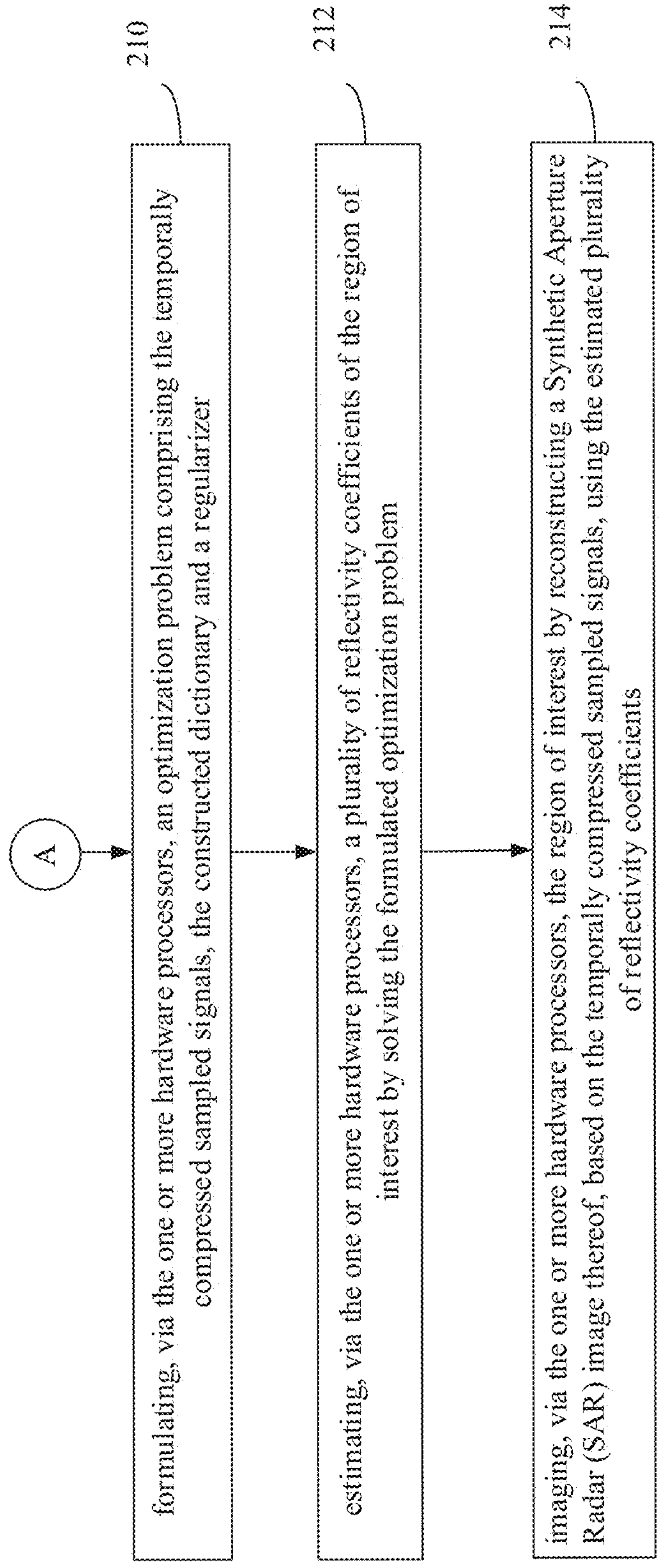
Figure 2C:
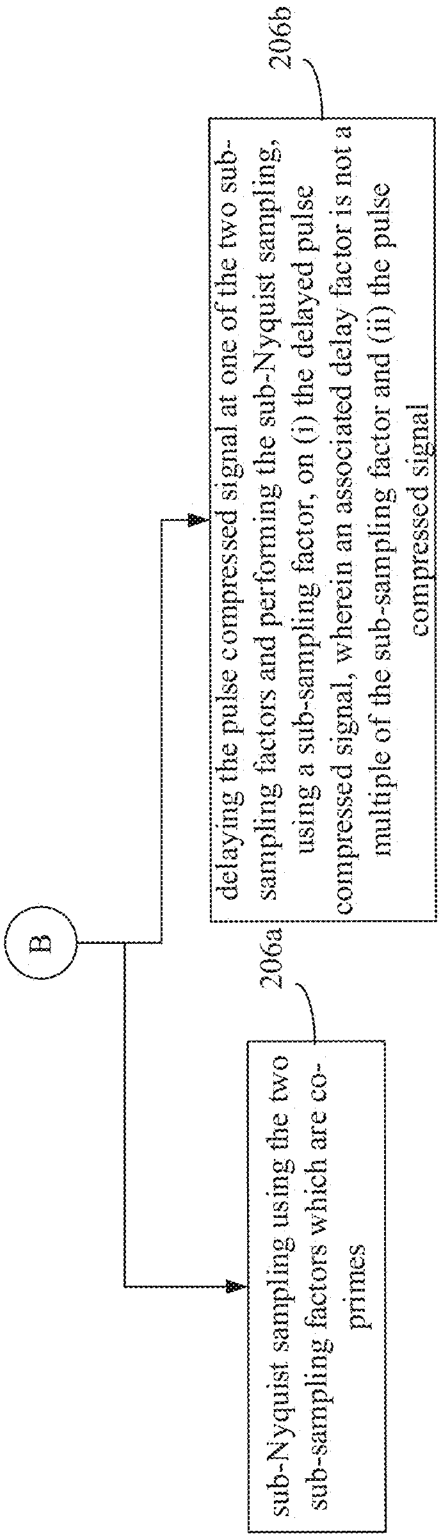

FIG. 2A through FIG. 2C illustrate an exemplary flow diagram of a computer implemented method 200 for dictionary based temporally compressed SAR image reconstruction, in accordance with some embodiments of the present disclosure. In an embodiment, the system 100 includes the memory 102 operatively coupled to the one or more hardware processors 104 and is configured to store instructions configured for execution of steps of the method 200 by the one or more hardware processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with the present disclosure, the one or more hardware processors 104, are configured to receive at step 202, a back scattered signal via a radar, from a region of interest for imaging. In an embodiment, the radar is an FMCW radar. Electromagnetic waves are illuminated from a transmitter which is mounted on a moving platform and the back scattered signal (echo) is captured at different positions for subsequent image reconstruction.

In accordance with the present disclosure, the one or more hardware processors 104, are configured to mix, at step 204, the received back scattered signal with a reference signal to obtain a pulse compressed signal. In an embodiment, the reference signal is a conjugate of a transmitted signal by the radar. In the event that the radar is the FMCW radar, the step of mixing comprises deramping as explained above.

Figure 3A:
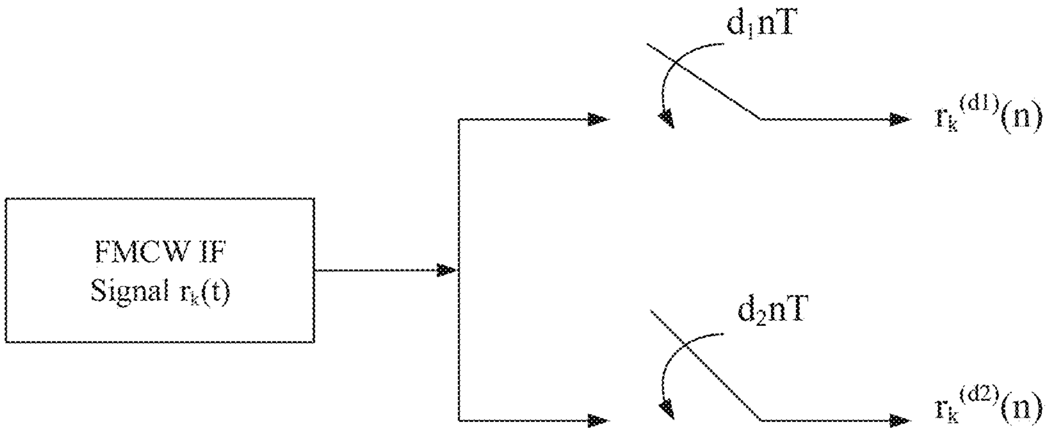
FIG.3A (PRIOR ART)
FIG. 3A, as known in the art and FIG. 3B, in accordance with some embodiments of the present disclosure illustrate two methods respectively of temporally sampling, at two sub-sampling factors, a pulse compressed signal.
Figure 3B:
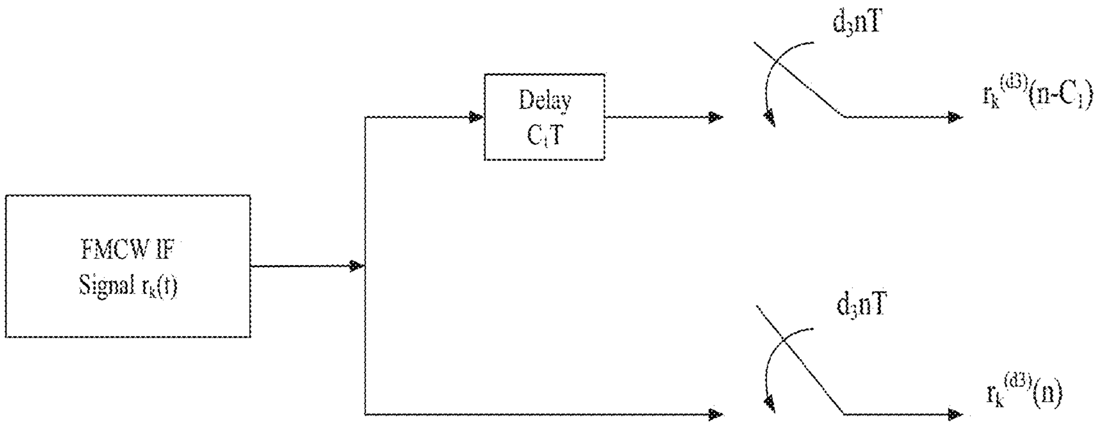

In accordance with the present disclosure, the one or more hardware processors 104, are configured to temporally sample, at step 206, the pulse compressed signal at two sub-sampling factors to obtain temporally compressed sampled signals, a signal from each of the two sub-sampling factors. The step of temporally sampling to acquire the temporally compressed sampled signals at sub-sampling rate comprises one of two methods provided herein below. FIG. 3A and FIG. 3B illustrate the two methods (approaches) of temporally sampling the pulse compressed signal, at two sub-sampling factors, in accordance with some embodiments of the present disclosure.

In accordance with a first approach referred to as step 206*a*, sub-Nyquist sampling is performed using the two sub-sampling factors ($d_1$ and $d_2$) which are co-primes. Referring to FIG. 3A, the pulse compressed signal referred as FMCW IF Signal $r_k$(t) is temporally sampled at two different sub-Nyquist rates using two sub-sampling factors ($d_1$ and $d_2$). The measurements that are collected at the two sampling rates are then concatenated to form a received measurement vector r. T represents a Nyquist sampling period.

In accordance with a second approach referred to as step 206*b*, the pulse compressed signal at one of the two sub-sampling factors is delayed and then the sub-Nyquist sampling is performed using a sub-sampling factor $d_3$, on (i) the delayed pulse compressed signal and (ii) the pulse compressed signal. In accordance with the present disclosure, a delay factor ($C_1$) is employed which is not a multiple of the sub-sampling factor $d_3$. In an embodiment, the sub-sampling factor $d_3$ maybe same as either of the two sub-sampling factors ($d_1$ and $d_2$). Referring to FIG. 3B, the pulse compressed signal referred as FMCW IF Signal $r_k$(t) and its delayed version are sampled at same rate using the same sub-sampling factor ($d_3$). In accordance with the present disclosure, $C_1$ and $d_3$ need to satisfy the following conditions:

$C_1$ is an integer $C_1 \neq nd_3$, where n is an integer

For any $d_3$, $C_1=1$ is valid.

In the second approach of step 206*b*, only one clock is sufficient, since the sampling is performed at the same rate. There are no common measurements between the sampler's output and hence no redundancy which in turn increases the number of measurements. Unlike in the first approach of step 206*a*, where the two sub-sampling factors ($d_1$ and $d_2$) are coprime, in the second approach, the sub-sampling factor $d_3$ can be any number and $C_1$ is accordingly selected.

In accordance with the present disclosure, the one or more hardware processors 104, are configured to construct, at step 208, a dictionary H based on the temporally compressed sampled signals obtained at step 206. Let $r_k^{(d_p)}(n)$, p={1,2} represent the two sub-sampling factors sampled signal which is expressed as given below.

$$r_k^{(d_p)}(n)=\sum_{l=1}^{L}\rho(x_l)e^{-i(\omega_0\tau(x_l)+2\alpha d_p n\tau(x_l)-\alpha\tau(x_l0^2)}+\eta_k^{d_p}(n).$$

Let $r=[r_k^{d_1}\ r_k^{d_2}]$, where $r_k^{d_p}=[r_1^{d_p}, r_2^{d_p}, \ldots r_k^{d_p}]\cdot r_k^{d_p}$ denotes a collection of $r_k^{d_p}$(n) for all time samples.

Equation (6) provided below represents a forward model equation from which a plurality of reflectivity coefficients ρ of the region of interest are estimated using the received measurement vector $r^{comp}$=vec{r} and the dictionary H.

$$r^{comp}=H\rho+\eta\rightarrow \quad (6)$$

In an embodiment, the step of constructing the dictionary H comprises one of (i) a union of measurement matrices $H_{d_1}$ and $H_{d_2}$ corresponding to the two sub-sampling factors $d_1$ and $d_2$ respectively as represented in Equation (7a) below and (ii) a union of measurement matrices $H_{d_3}$ and $H_{d_{3\text{-delayed}}}$ corresponding to the sub-sampling factor $d_3$ on the pulse compressed signal and the delayed pulse compressed signal respectively as represented in Equations (7b1 and 7b2) below.

Let N denote number of time samples, then in an embodiment, the dictionary $H=[H_{d_1},H_{d_2}]^T$, where $H_{d_p}$ is a NK×L dimension matrix, whose $(u,w)^{th}$ atom is expressed as Equation (7a) given below.

$$\left[H_{d_p}\right]_{u,w} = e^{-i\left(\omega_0\tau_u(x_w)+2\alpha d_p wn\tau_u(x_w)-\alpha\tau_u(x_w)^2\right)} \rightarrow \quad (7a)$$

where $\tau_u(x_w)=2R_u(x_u)/c$, which represents a range from $u^{th}$ radar location to $$x_w^{th}$$

position in an image space.

In another embodiment, the dictionary $H=[H_{d_3}, H_{(d_{3\text{-delayed}})}]^T$. For $d_3$, $$r_k^{(d_3)}(n) = \sum\nolimits_{l=1}^{L}\rho(x_l)\ e^{-i\left(\omega_0\tau(x_1)+2\alpha d_3\pi\tau(x_1)-\alpha\tau(x_l)^2\right.} + \eta_k^{d_3}(n) \quad (7b1)$$

and $$\left[H_{d_3}\right]_{u,w} = e^{-i\left(\omega_0\tau_u(x_w)+2\alpha d_3 wn\tau_u(x_w)-\alpha\tau_u(x_w)^2\right)} \rightarrow$$

For $d_{3\text{-delayed}}$, the pulse compressed signal gets delayed by $C_1$.

$$r_k^{\left(d_{3-delayed}\right)}(n-C_1) = \sum\nolimits_{l=1}^{L}\rho(x_l)e^{-i\left(\omega_0\tau(x_l)+2\alpha\left(d_{3-delayed}\right)(n-C_1)\tau(x_l)-\alpha\tau(x_l)^2\right)} + \eta_k^{\left(d_{3-delayed}\right)}(n-C_1) \text{ and } \left[H_{(d_{3-delayed})}\right]_{u,w} = e^{-i\left(\omega_0\tau_u(x_v)+2\alpha\left(d_{3-delayed}\right)w(n-C_1)\tau_u(x_w)-\alpha\tau_u(x_w)^2\right]} \rightarrow (7b2)$$

In accordance with the present disclosure, the one or more hardware processors 104, are configured to formulate, at step 210, an optimization problem comprising the temporally compressed sampled signals, the constructed dictionary H and a regularizer. Further, in accordance with the present disclosure, the one or more hardware processors 104, are configured to estimate, at step 212, the plurality of reflectivity coefficients of the region of interest by solving the formulated optimization problem.

$\rho=[\rho(x_1), \rho(x_2), \ldots \rho(x_L)]^T$ denotes a vector of the plurality of reflectivity coefficients. It may be noted that rows of $H_{d_1}$ and $H_{d_2}$ at row position, aLCM($d_1$, $d_2$), a∈ℤ are common (duplicate). In accordance with the present disclosure, the duplicate rows and corresponding measurements are removed by retaining only one row and the corresponding measurement, hence the actual dimension of H will be M×L, where M=(2NK−|aLCM($d_1$, $d_2$):aLCM($d_1$, $d_2$)<N}|).

The task is to estimate ρ given the measurements $r^{comp}$ and the dictionary H. Typically, the number of measurements that are collected are less than the image dimension. So, the relation mentioned in Equation (6) becomes an ill-posed problem. However, if the dictionary H satisfies certain properties then the plurality of reflectivity coefficients ρ can be estimated by solving the optimization problem as represented in Equation (8) below, wherein R(ρ) is the regularizer on ρ, and λ is a penalty term which controls the amount of $$\hat{\rho} = \underset{\rho}{\operatorname{argmin}}|r^{comp} - H\rho|_2 + \lambda R(\rho) \rightarrow \quad (8)$$

In an embodiment, the formulated optimization problem is solved using an Alternating Direction Method of Multipliers (ADMM). In another embodiment, one of Iterative Shrinkage/Thresholding Algorithm (ISTA), Fast ISTA (FISTA) or Least Absolute Shrinkage and Selection Operator' (LASSO) may be used.

In accordance with the present disclosure, when the ADDM method is used, a proxy variable v is introduced and Equation (8) is converted into a constrained optimization problem represented as Equation (9) below.

$$\{\hat{\rho}, \hat{v}\} = \underset{\rho,v}{\operatorname{argmin}}\ D(\rho)+\lambda R(v) \text{ subject to } \rho = v \rightarrow \quad (9)$$

where $D(\rho)=|r^{comp}-H\rho|_2$ represents data fidelity.

The Augmented Lagrangian representation of Equation (9) is expressed as shown in Equation (10) below.

$$\mathcal{L}(\rho, v, u) = D(\rho) + \lambda R(v) + u^T(\rho - v) + \frac{\mu}{2}\|\rho - v\|_2^2 \rightarrow (10)$$

where μ is a penalty parameter and u represents a Lagrangian parameter. The minimizer of Equation (9) is the saddle point of $\mathcal{L}$(ρ, v, u) which is derived by solving Equation (10) using the ADMM iterations. ρ and the proxy variables (u,v) are iteratively updated.

$$\rho^{(k+1)} = \underset{\rho}{\operatorname{argmin}}\ D(\rho) + \frac{\mu}{2}\left\|\rho - \tilde{\rho}^{(k)}\right\|_2^2 \rightarrow \quad (11)$$

$$v^{(k+1)} = \underset{v}{\operatorname{argmin}}\frac{2\lambda}{\mu}R(v) + \left\|v - \tilde{v}^{(k)}\right\|_2^2 \rightarrow \quad (12)$$

$$\overline{u}^{(k+1)} = \overline{u}^{(k)} + \left(\rho^{(k+1)} - v^{(k+1)}\right) \rightarrow \quad (13)$$

where $$\overline{u}^{(k)} = \frac{1}{\mu}u^{(k)},\ \tilde{\rho}^{(k)} = v^{(k)} - \overline{u}^{(k)}$$

and $$\tilde{v}^{(k)} = \rho^{(k+1)} + \overline{u}^{(k)}.$$

Equation (14) provides a closed form update to solve for ρ.

$$\left(\frac{\mu}{2}I + H^T H\right)\hat{\rho} = H^T r^{comp} + \frac{\mu}{2}\tilde{\rho} \rightarrow (14)$$

In an embodiment, the regularizer is one of Block-Matching 3D (BM3D), Total Variation (TV), Deep Image Priors (DIPs), and the like. In an embodiment, the regularizer can be learnt from the image itself.

In accordance with the present disclosure, the one or more hardware processors 104, are configured to image, at step

214, the region of interest by reconstructing a SAR image thereof, based on the temporally compressed sampled signals, using the estimated plurality of reflectivity coefficients ρ.

EXPERIMENTAL RESULTS

FIG. 4A through FIG. 4F illustrate six synthetic SAR images (scenes) available in the art (https://ieeexplore.ieee.org/document/9308950), used for simulations, in accordance with some embodiments of the present disclosure. The gray scale values provide the plurality of reflectivity coefficients ρ(x). The following FMCW parameters were used in the simulation: carrier frequency=100 MHz, Bandwidth B=2 MHz and the chirp period T=0.125 μs. Appropriate sub-sampling coprime factors $d_1$ and $d_2$ based on the required compression factor are selected. The hyper-parameters and A are chosen using a grid search.

Figure 5A:
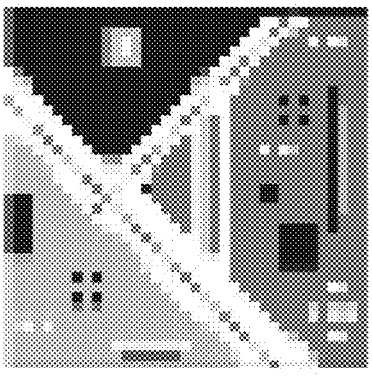
FIG. 5A illustrates a visual SAR ground truth image which is the FIG. 4F reproduced for ease of reference.
Figure 5B:
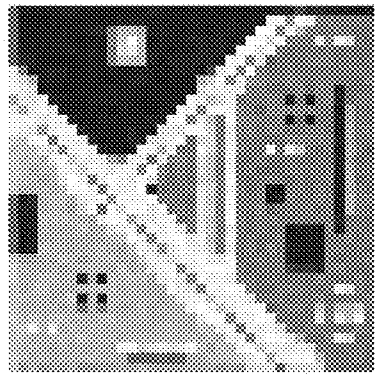
FIG. 5B illustrates visual SAR image reconstruction at SNR of dB, peak signal-to-noise ratio (PSNR) being 29.9 for uncompressed back scattered signal, in accordance with some embodiments of the present disclosure.
Figure 5C:
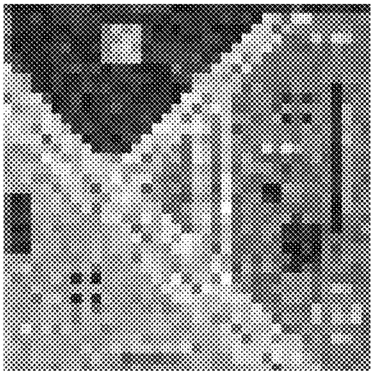
FIG. 5C illustrates visual SAR image reconstruction at SNR of dB and PSNR of 19.2 with 50% temporal compression for Spatial Decimation, in accordance with some embodiments of the present disclosure.
Figure 5D:
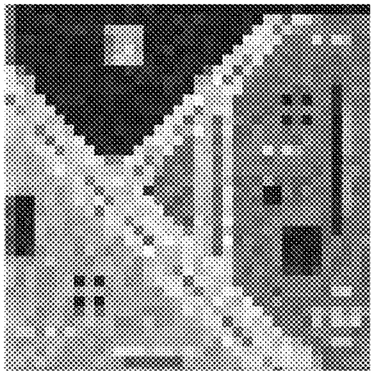
FIG. 5D illustrates visual SAR image reconstruction at SNR of dB, and PSNR of 23.2 with 50% temporal compression for Range Compressive Sampling (CS), in accordance with some embodiments of the present disclosure.
Figure 5E:
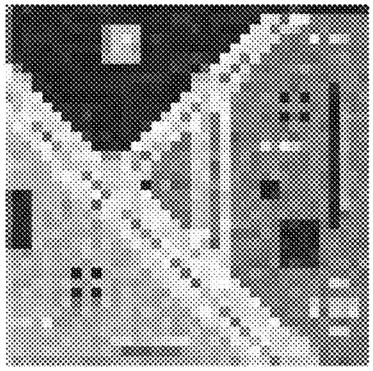
FIG. 5E illustrates visual SAR image reconstruction at SNR of dB, and PSNR of 24.3 with 50% temporal compression for Compressed Coprime Frequency-Modulated Continuous Wave (FMCW) SAR, in accordance with some embodiments of the present disclosure, in accordance with some embodiments of the present disclosure.

FIG. 5A through FIG. 5E illustrate visual reconstruction performance of different approaches compared to the method of the present disclosure at SNR of 20 dB. FIG. 5A illustrates a visual SAR ground truth image which is the FIG. 4F reproduced for ease of reference, FIG. 5B illustrates visual SAR image reconstruction at peak signal-to-noise ratio (PSNR) of 29.9 for uncompressed back scattered signal, FIG. 5C illustrates visual SAR image reconstruction at PSNR of 19.2 with 50% temporal compression for Spatial Decimation, FIG. 5D illustrates visual SAR image reconstruction at PSNR of 23.2 with 50% temporal compression for Range Compressive Sampling (CS), and FIG. 5E illustrates visual SAR image reconstruction at PSNR of 24.3 with 50% temporal compression for Compressed Coprime Frequency-Modulated Continuous Wave (FMCW) SAR, in accordance with some embodiments of the present disclosure. It was noted that the uncompressed approach performs best and the method of the present disclosure (FIG. 5E) performs better than the range CS method.

Figure 4A:
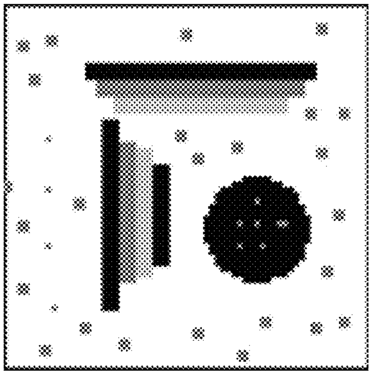
FIG.4A (PRIOR ART)
FIG. 4A illustrates a first synthetic SAR images (scenes) available in the art, used for simulations, in accordance with some embodiments of the present disclosure.
Figure 4B:
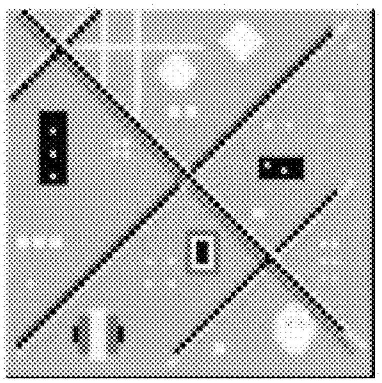
FIG.4B (PRIOR ART)
FIG. 4B illustrates a second synthetic SAR images (scenes) available in the art, used for simulations, in accordance with some embodiments of the present disclosure.
Figure 4C:
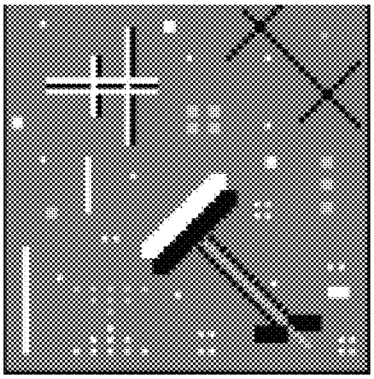
FIG.4C (PRIOR ART)
FIG. 4C illustrates a third synthetic SAR images (scenes) available in the art, used for simulations, in accordance with some embodiments of the present disclosure.
Figure 4D:
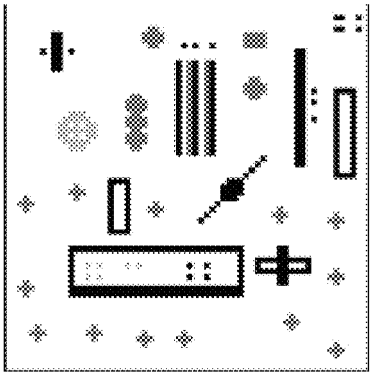
FIG.4D (PRIOR ART)
FIG. 4D illustrates a fourth synthetic SAR images (scenes) available in the art, used for simulations, in accordance with some embodiments of the present disclosure.
Figure 4E:
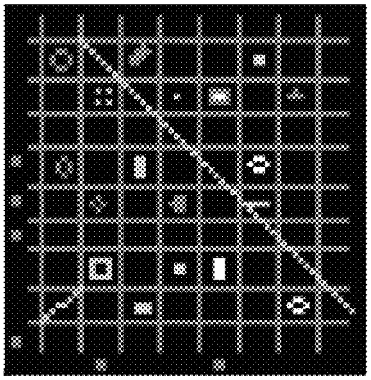
FIG.4E (PRIOR ART)
FIG. 4E illustrates a fifth synthetic SAR images (scenes) available in the art, used for simulations, in accordance with some embodiments of the present disclosure.
Figure 4F:
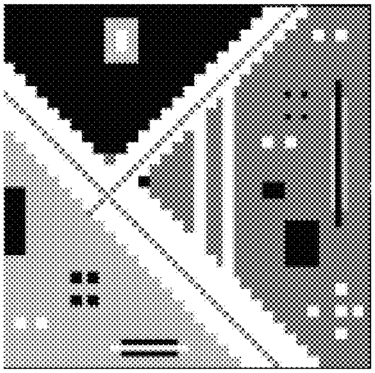
FIG.4F (PRIOR ART)
FIG. 4F illustrates a sixth synthetic SAR images (scenes) available in the art, used for simulations, in accordance with some embodiments of the present disclosure.
Figure 6A:
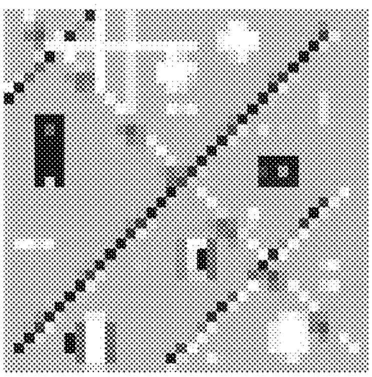
FIG. 6A illustrates a visual SAR ground truth image which is the FIG. 4B reproduced for ease of reference.
Figure 6B:
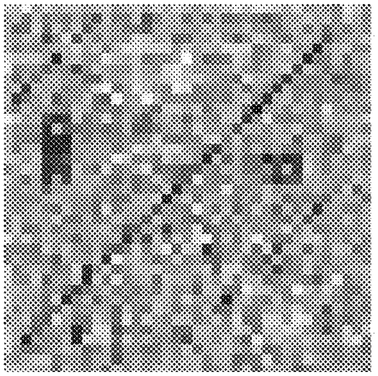
FIG. 6B through FIG. 6G illustrate a visual SAR ground truth image reconstruction of the Compressed Coprime FMCW SAR, at 50% temporal compression for different SNR values, in accordance with some embodiments of the present disclosure.
Figure 6C:
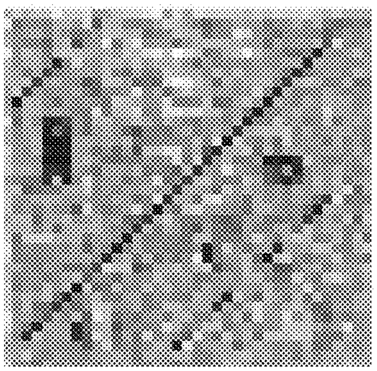
Figure 6D:
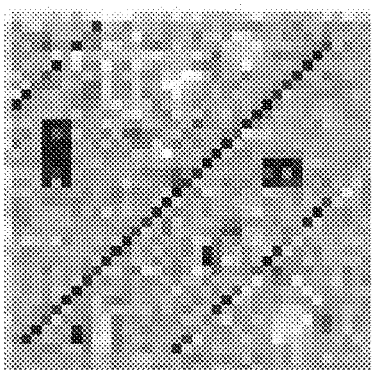
Figure 6E:
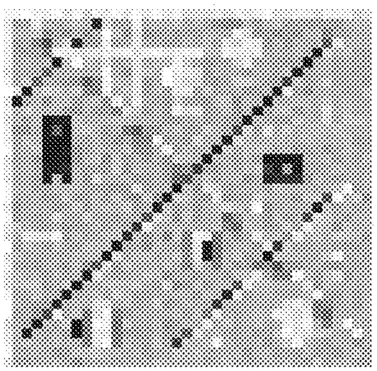
Figure 6F:
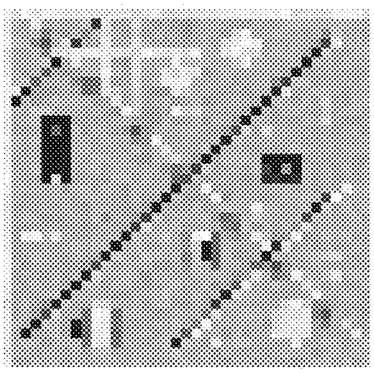
Figure 6G:
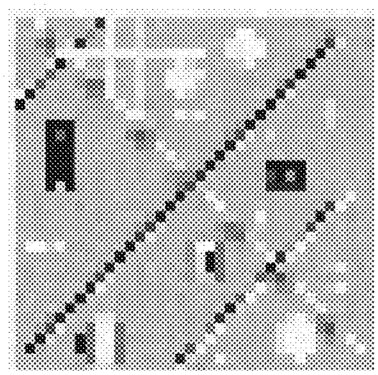
Figure 7A:
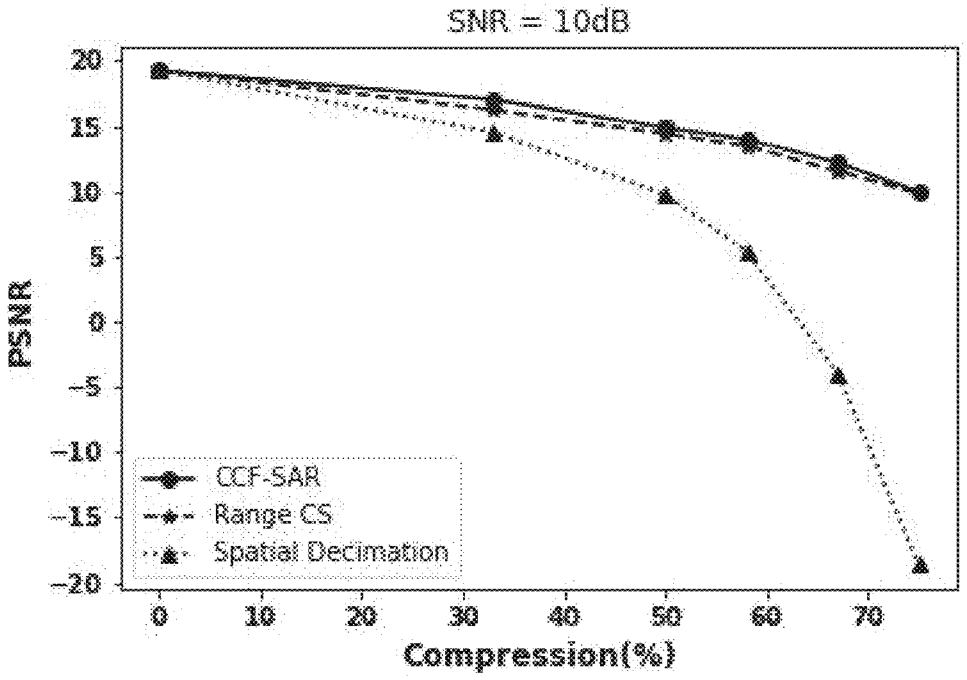
FIG. 7A illustrates a first PSNR and Structural Similarity Index metric (SSIM) comparison for different methods with varying compression ratios at three different SNR values, in accordance with some embodiments of the present disclosure.
Figure 7B:
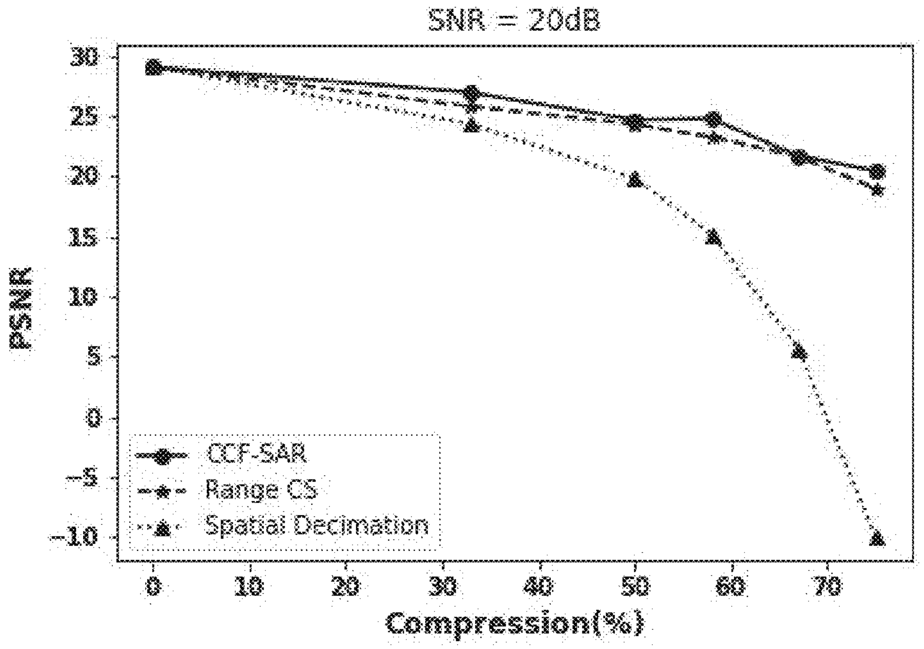
FIG. 7B illustrates a second PSNR and Structural Similarity Index metric (SSIM) comparison for different methods with varying compression ratios at three different SNR values, in accordance with some embodiments of the present disclosure.
Figure 7C:
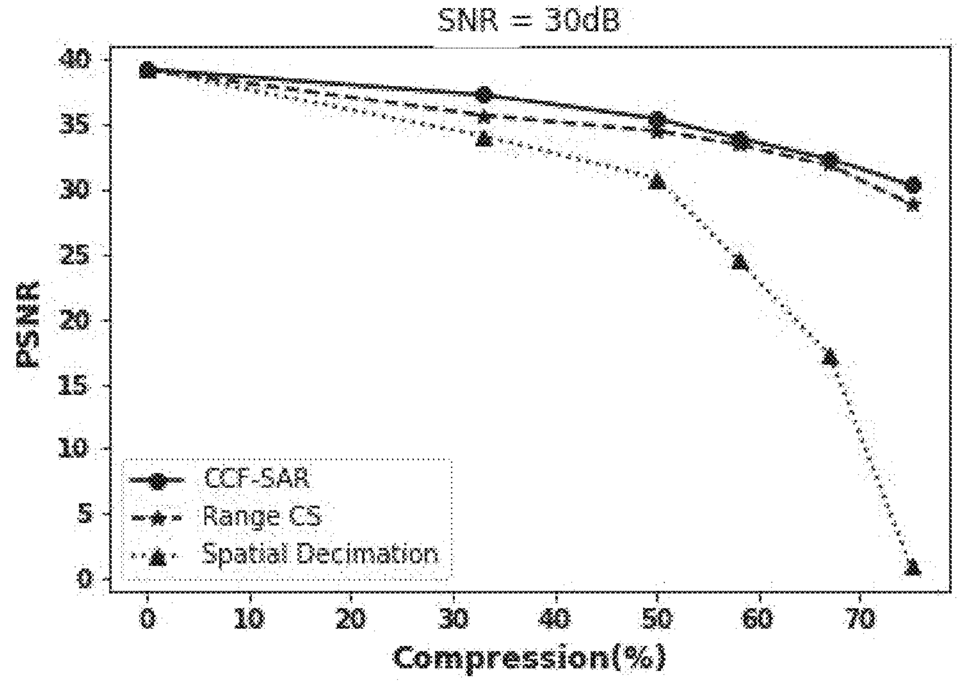
FIG. 7C illustrates a third PSNR and Structural Similarity Index metric (SSIM) comparison for different methods with varying compression ratios at three different SNR values, in accordance with some embodiments of the present disclosure.
Figure 7D:
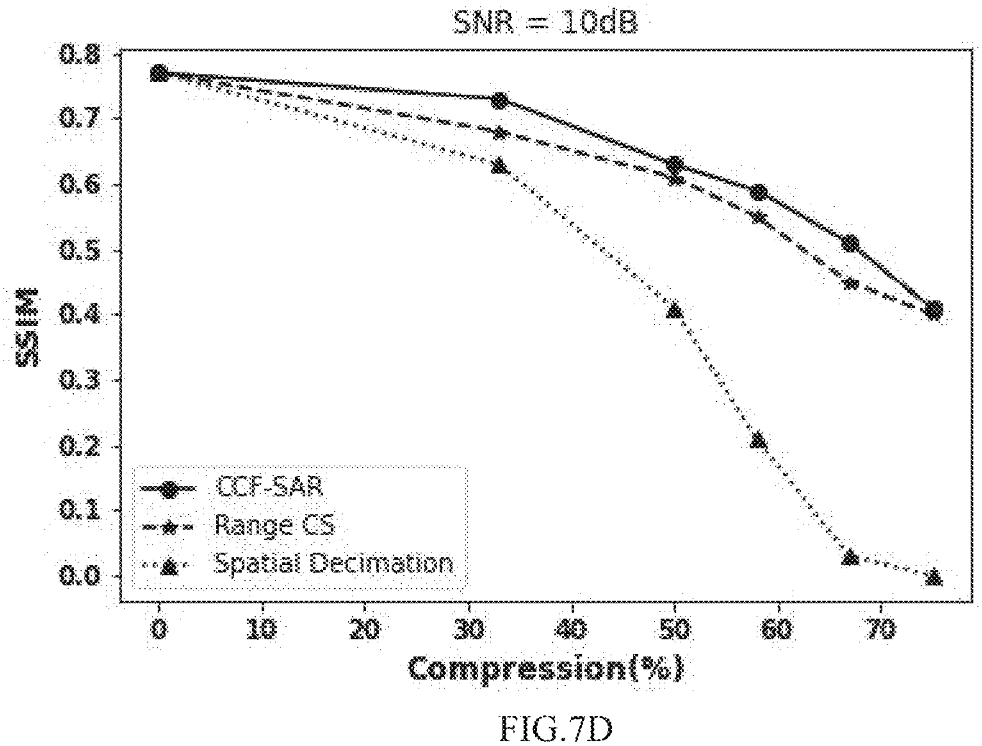
FIG. 7D illustrates a fourth PSNR and Structural Similarity Index metric (SSIM) comparison for different methods with varying compression ratios at three different SNR values, in accordance with some embodiments of the present disclosure.
Figure 7E:
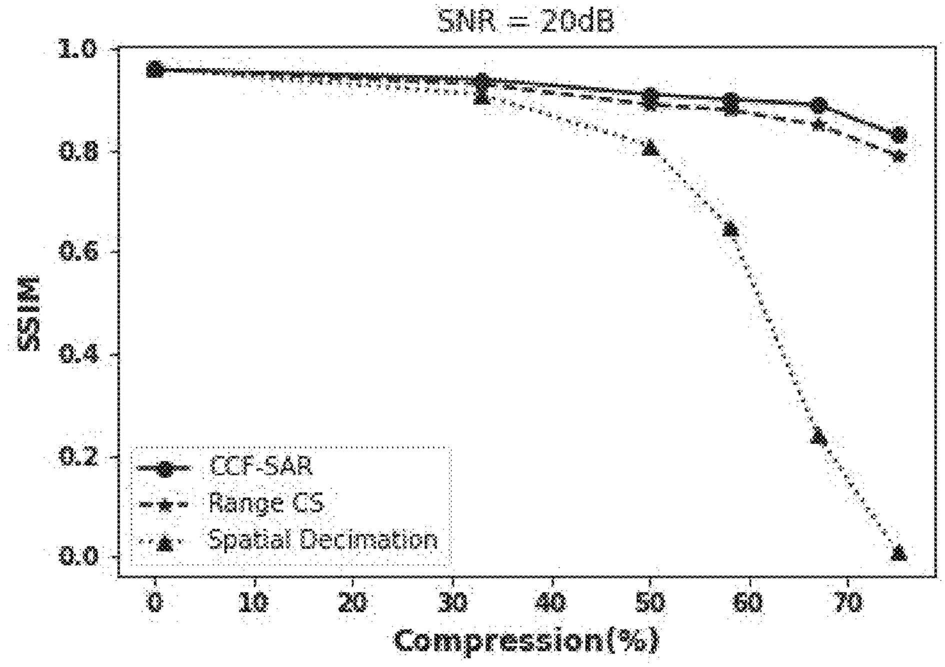
FIG. 7E illustrates a fifth PSNR and Structural Similarity Index metric (SSIM) comparison for different methods with varying compression ratios at three different SNR values, in accordance with some embodiments of the present disclosure.
Figure 7F:
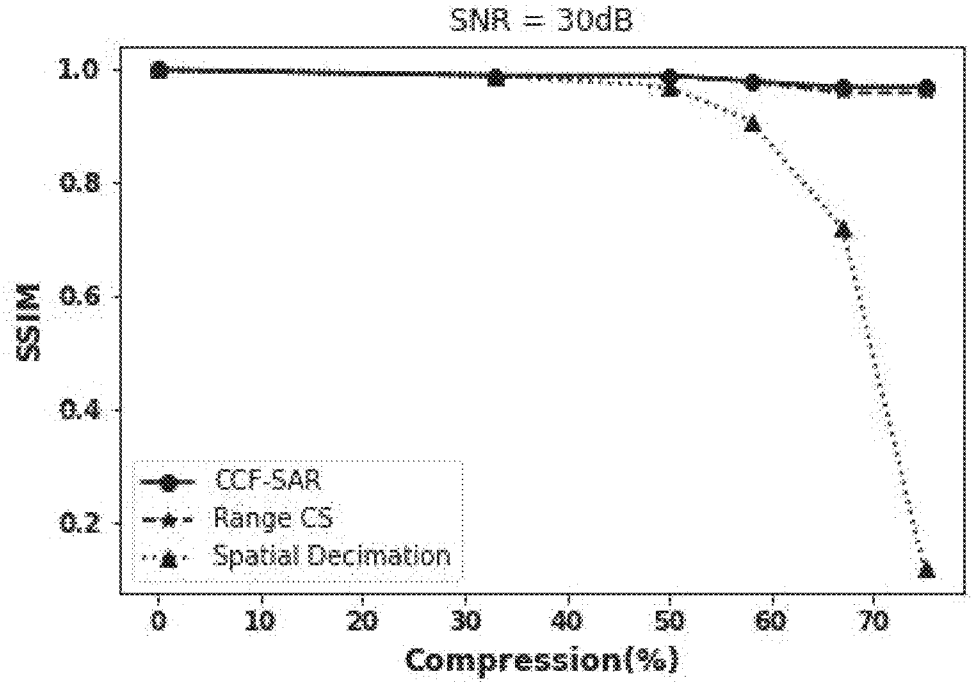
FIG. 7F illustrates a sixth PSNR and Structural Similarity Index metric (SSIM) comparison for different methods with varying compression ratios at three different SNR values, in accordance with some embodiments of the present disclosure.

FIG. 6A illustrates a visual SAR ground truth image which is the FIG. 4B reproduced for ease of reference. FIG. 6B through FIG. 6G illustrate visual SAR image reconstruction of the Compressed Coprime FMCW SAR, in accordance with some embodiments of the present disclosure, at 50% temporal compression for different SNR values, viz., ground truth, 10 dB, 14 dB, 18 dB, 22 dB, 26 dB, and 30 dB respectively. It was noted that the reconstruction improved with increase in SNR.

In order to quantitatively measure the performance of image reconstruction, the PSNR and Structural Similarity Index metric (SSIM) metrics for varying compression ratios at three different SNR values was assessed. FIG. 7A through FIG. 7F illustrate PSNR and SSIM comparison for different methods with varying compression ratios at three different SNR values. It is observed that, with increase in the compression ratio and with decreasing SNRs, the performance drops for all the methods. It is clear from the plots that the method of the present disclosure (referenced as CCF-SAR) performs significantly better than the Spatial Decimation and slightly better than the range CS. Further, it is important to note here that while range CS requires more complex hardware for its implementation, as compared to the method of the present disclosure that has a simpler architecture that is easy to realize in practice.

Thus, the above experimental results demonstrate that the method of the present disclosure performs slightly better than the current state-of-art range CS based approach with additional benefit of frugal hardware implementation. Further, while the prior art processes the compressed sampled signals using Fourier transform based methods which lack efficiency owing to the measurement and dimensions associated with SAR images, the method of the present disclosure employs a dictionary based approach which can easily be scaled for higher order model size. The simpler sub-Nyquist sampling approaches of the present disclosure that employ a simpler architecture with frugal hardware, the dictionary based reconstruction approach, and solving of the forward model optimization problem using the ADMM approach which allows use of readily available PnP priors enables the method and system of the present disclosure to find wide application in remote sensing.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for dictionary based temporally compressed Synthetic Aperture Radar (SAR) image reconstruction, comprising:

receiving via a radar, a back scattered signal from a region of interest for imaging, wherein the radar is a Frequency Modulated Continuous Wave (FMCW) radar, and electromagnetic waves are illuminated from a transmitter which is mounted on a moving platform and back scattered signal is captured at varied positions for subsequent image reconstruction;

mixing, via one or more hardware processors, the received back scattered signal with a reference signal to obtain a pulse compressed signal, wherein the reference signal is a conjugate of a transmitted signal by the radar;

temporally sampling, via the one or more hardware processors, the pulse compressed signal at two sub-sampling factors, to obtain temporally compressed sampled signals, a signal from each of the two sub-sampling factors, wherein the temporally sampling comprises one of:

sub-Nyquist sampling using the two sub-sampling factors ($d_1$ and $d_2$) which are co-primes; and delaying the pulse compressed signal at one of the two sub-sampling factors and performing the sub-Nyquist sampling, using a sub-sampling factor $d_3$ on (i) the delayed pulse compressed signal, wherein an associated delay factor ($C_1$) is not a multiple of the sub-sampling factor $d_3$ and (ii) the pulse compressed signal, the pulse compressed signal referred as FMCW Intermediate Frequency (IF) Signal $r_k(t)$ and corresponding delayed version are sampled at same rate using same sub-sampling factor $d_3$, and $C_1$ and $d_3$ need to satisfy conditions including $C_1$ is an integer, $C_1 \neq nd_3$, where n is an integer, for $d_3$, $C_1=1$ is valid, and only one clock is sufficient, since the sub-Nyquist sampling is performed at same rate, and absence of common measurements between the sub-Nyquist sampler's output and absence of redundancy that increases number of measurements;

constructing, via the one or more hardware processors, a dictionary H based on the temporally compressed sampled signals, wherein the step of constructing a dictionary H based on the sampled signals comprises one of (i) a union of measurement matrices $H_{d_1}$ and $H_{d_2}$ corresponding to the two sub-sampling factors $d_1$ and $d_2$ respectively, wherein N denote number of time samples, the dictionary $H=[H_{d_1},H_{d_2}]^T$, where $H_{d_p}$ is a NK×L dimension matrix, whose $(u,w)^{th}$ atom is expressed as:

$$[H_{d_p}]_{u,w}=e^{-i(\omega_0\tau_u(x_w)+2\alpha d_p wn\tau_u(x_w)-\alpha\tau_u(x_w)^2)}$$

where $\tau_u(x_w)=2R_u(x_u)/c$, which represents a range from $u^{th}$ radar location to $$x_w^{th}$$

position in an image space, and (ii) a union of measurement matrices $H_{d_s}$ and $H_{d_{3\text{-}delayed}}$ corresponding to the sub-sampling factor $d_3$ on the pulse compressed signal and the delayed pulse compressed signal respectively; and wherein each atom of the dictionary H is computed based on a time delay;

formulating, via the one or more hardware processors, an optimization problem comprising the temporally compressed sampled signals, the constructed dictionary and a regularizer;

estimating, via the one or more hardware processors, a plurality of reflectivity coefficients of the region of interest by solving the formulated optimization problem, wherein $\rho=[\rho(x_1), \rho(x_2), \ldots \rho(x_L)]^T$ denotes a vector of the plurality of reflectivity coefficients, and rows of $H_{d_1}$ and $H_{d_2}$ at row position, aLCM($d_1$, $d_2$), $a \in \mathbb{Z}$ are duplicates, wherein duplicate rows and corresponding measurements are removed by retaining only one row and the corresponding measurement; and imaging, via the one or more hardware processors, the region of interest by reconstructing a Synthetic Aperture Radar (SAR) image thereof, based on the temporally compressed sampled signals, using the estimated plurality of reflectivity coefficients, wherein the sub-Nyquist sampling employs architecture with a hardware, using the dictionary based reconstruction approach, wherein the solving of the formulated optimization problem using an Alternating Direction Method of Multipliers (ADMM) approach is applied in the field of remote sensing.

2. The processor implemented method of claim 1, wherein the step of constructing a dictionary H based on the sampled signals comprises the union of measurement matrices $H_{d_3}$ and $H_{d_{3\text{-}delayed}}$ corresponding to the sub-sampling factor $d_3$ on the pulse compressed signal and the delayed pulse compressed signal, wherein dictionary $H=[H_{d_3}, H_{(d_{3\text{-}delayed})}]^T$ wherein for $d_3$, $$r_k^{(d_3)}(n) = \sum_{l=1}^{L} \rho(x_l) e^{-i\left(\omega_0\tau(x_l)+2\alpha d_3 n\tau(x_l)-\alpha\tau(x_l)^2\right)} + \eta_k^{d_3}(n) \text{ and}$$

$$\left[H_{d_3}\right]_{u,w} = e^{-i\left(\omega_0\tau_u(x_w)+2\alpha d_3 wn\tau_u(x_w)-\alpha\tau_u(x_w)^2\right)}$$

for $d_{3\text{-}delayed}$, the pulse compressed signal is delayed by $C_1$, $$r_k^{(d_{3-delayed})}(n-C_1) = \sum_{l=1}^{L} \rho(x_l) e^{-i\left(\omega_0 \tau(x_l) + 2\alpha(d_{3-delayed})(n-C_1)\tau(x_l) - \alpha\tau(x_l)^2\right)} + \eta_k^{(d_{3-delayed})}(n-C_1) \text{ and}$$

$$\left[H_{(d_{3-delayed})}\right]_{u,w} = e^{-i\left(\omega_0 \tau_u(x_v) + 2\alpha(d_{3-delayed}) w(n-C_1)\tau_u(x_w) - \alpha\tau_u(x_w)^2\right)}.$$

3. The processor implemented method of claim 1, wherein the formulated optimization problem is represented as:

$$\hat{\rho} = \underset{\rho}{\operatorname{argmin}} |r^{comp} - H\rho|_2 + \lambda R(\rho)$$

where $R(\rho)$ is the regularizer on the plurality of reflectivity coefficients $\rho$, $\lambda$ is a penalty term which controls the amount of regularization and $r^{comp} = \text{vec}\{r\}$, where r is a collection of temporally compressed sampled signals.

4. The processor implemented method of claim 3, wherein the formulated optimization problem is solved using the ADMM, and a proxy variable v is introduced and the formulated optimization problem is converted into a constrained optimization problem as:

$$\{\hat{\rho}, \hat{v}\} = \underset{\rho, v}{\operatorname{argmin}}\ D(\rho) + \lambda R(v) \text{ subject to } \rho = v$$

where $D(\rho) = |r^{comp} - H\rho|_2$ represents data fidelity.

5. A system for dictionary based temporally compressed Synthetic Aperture Radar (SAR) image reconstruction comprising:

a memory storing instructions;

one or more communication interfaces; and one or more hardware processors coupled to the memory via the one or more communication interfaces, wherein the one or more hardware processors are configured by the instructions to:

receive via a radar, a back scattered signal from a region of interest for imaging, wherein the radar is a Frequency Modulated Continuous Wave (FMCW) radar, and electromagnetic waves are illuminated from a transmitter which is mounted on a moving platform and back scattered signal is captured at varied positions for subsequent image reconstruction;

mix, the received back scattered signal with a reference signal to obtain a pulse compressed signal, wherein the reference signal is a conjugate of a transmitted signal by the radar;

temporally sample, the pulse compressed signal at two sub-sampling factors, to obtain temporally compressed sampled signals, a signal from each of the two sub-sampling factors, wherein the temporally sampling comprises one of:

sub-Nyquist sampling using the two sub-sampling factors ($d_1$ and $d_2$) which are co-primes; and delaying the pulse compressed signal at one of the two sub-sampling factors and performing the sub-Nyquist sampling, using a sub-sampling factor $d_3$ on (i) the delayed pulse compressed signal, wherein an associated delay factor ($C_1$) is not a multiple of the sub-sampling factor $d_3$ and (ii) the pulse compressed signal, the pulse compressed signal referred as FMCW Intermediate Frequency (IF) Signal $r_k(t)$ and corresponding delayed version are sampled at same rate using same sub-sampling factor $d_3$, and C and $d_3$ need to satisfy conditions including $C_1$ is an integer, $C_1 \neq nd_3$, where n is an integer, for $d_3$, $C_1=1$ is valid, and only one clock is sufficient, since the sub-Nyquist sampling is performed at same rate, and absence of common measurements between the sub-Nyquist sampler's output and absence of redundancy that increases number of measurements;

construct, a dictionary based on the temporally compressed sampled signals, wherein the step of constructing a dictionary H based on the sampled signals comprises one of (i) a union of measurement matrices Ha, and $H_{d_2}$ corresponding to the two sub-sampling factors $d_1$ and $d_2$ respectively, wherein N denote number of time samples, the dictionary $H=[H_{d_1}, H_{d_2}]^T$, where $H_{d_p}$ is a NK×L dimension matrix, whose $(u,w)^{th}$ atom is expressed as:

$$[H_{d_p}]_{u,w} = e^{-i(\omega_0\tau_u(x_w) + 2\alpha d_p w n \tau_u(x_w) - \alpha\tau_u(x_w)^2)}$$

where $\tau_u(x_w) = 2R_u(x_u)/c$, which represents a range from $u^{th}$ radar location to $$x_w^{th}$$

position in an image space, and (ii) a union of measurement matrices $H_{d_3}$ and $H_{d_{3\text{-}delayed}}$ corresponding to the sub-sampling factor $d_3$ on the pulse compressed signal and the delayed pulse compressed signal respectively; and wherein each atom of the dictionary H is computed based on a time delay;

formulate, an optimization problem comprising the temporally compressed sampled signals, the constructed dictionary and a regularizer;

estimate, a plurality of reflectivity coefficients of the region of interest by solving the formulated optimization problem, wherein $\rho = [\rho(x_1), \rho(x_2), \ldots \rho(x_1)]^T$ denotes a vector of the plurality of reflectivity coefficients, and rows of $H_{d_1}$ and $H_{d_2}$ at row position, $a\text{LCM}(d_1, d_2)$, $a \in \mathbb{Z}$ are duplicates, wherein duplicate rows and corresponding measurements are removed by retaining only one row and the corresponding measurement; and image, the region of interest by reconstructing a Synthetic Aperture Radar (SAR) image thereof, based on the temporally compressed sampled signals, using the estimated plurality of reflectivity coefficients, wherein the sub-Nyquist sampling employs architecture with frugal a hardware, using the dictionary based reconstruction approach, wherein the solving of the formulated optimization problem using an Alternating Direction Method of Multipliers (ADMM) approach is applied in the field of remote sensing.

6. The system of claim 5, wherein the one or more processors are configured to construct a dictionary based on the sampled signals by the union of measurement matrices $H_{d_3}$ and $H_{d_{3\text{-}delayed}}$ corresponding to the sub-sampling factor $d_3$ on the pulse compressed signal and the delayed pulse compressed signal, wherein dictionary $H=[H_{d_3}, H_{(d_3\text{-}delayed)}]^T$ wherein for $d_3$, $$r_k^{(d_3)}(n) = \sum_{l=1}^{L} \rho(x_l) e^{-i\left(\omega_0\tau(x_l) + 2\alpha d_3 n \tau(x_l) - \alpha\tau(x_l)^2\right)} + \eta_k^{d_3}(n) \text{ and}$$

$$\left[H_{d_3}\right]_{u,w} = e^{-i\left(\omega_0\tau_u(x_w) + 2\alpha d_3 w n \tau_u(x_w) - \alpha\tau_u(x_w)^2\right)}$$

for $d_{3\text{-}delayed}$, the pulse compressed signal is delayed by $C_1$, $$r_k^{(d_{3-delayed})}(n - C_1) = \sum_{l=1}^{L} \rho(x_l) e^{-i\left(\omega_0 \tau(x_l) + 2\alpha(d_{3-delayed})(n-C_1)\tau(x_l) - \alpha\tau(x_l)^2\right)} + \eta_k^{(d_{3-delayed})}(n - C_1) \text{ and}$$

$$\left[H_{(d_{3-delayed})}\right]_{u,w} = e^{-i\left(\omega_0 \tau_u(x_v) + 2\alpha(d_{3-delayed})w(n-C_1)\tau_u(x_w) - \alpha\tau_u(x_w)^2\right)}.$$

7. The system of claim 5, wherein the formulated optimization problem is represented as:

$$\hat{\rho} = \underset{\rho}{\operatorname{argmin}} |r^{comp} - H\rho|_2 + \lambda R(\rho)$$

where $R(\rho)$ is the regularizer on the plurality of reflectivity coefficients $\rho$, $\lambda$ is a penalty term which controls the amount of regularization and $r^{comp}=\text{vec}\{r\}$, where r is a collection of temporally compressed sampled signals.

8. The system of claim 7, wherein the formulated optimization problem is solved using the ADMM, and a proxy variable v is introduced and the formulated optimization problem is converted into a constrained optimization problem as:

$$\{\hat{\rho}, \hat{v}\} = \underset{\rho,\, v}{\operatorname{argmin}}\, D(\rho) + \lambda R(v)$$

subject to $\rho=v$ where $D(\rho)=|r^{comp}-H\rho|_2$ represents data fidelity.

9. One or more non-transitory machine-readable information storage mediums for dictionary based temporally compressed Synthetic Aperture Radar (SAR) image reconstruction comprising one or more instructions which when executed by one or more hardware processors cause:

receiving via a radar, a back scattered signal from a region of interest for imaging, wherein the radar is a Frequency Modulated Continuous Wave (FMCW) radar, and electromagnetic waves are illuminated from a transmitter which is mounted on a moving platform and back scattered signal is captured at varied positions for subsequent image reconstruction;

mixing the received back scattered signal with a reference signal to obtain a pulse compressed signal, wherein the reference signal is a conjugate of a transmitted signal by the radar;

temporally sampling the pulse compressed signal at two sub-sampling factors, to obtain temporally compressed sampled signals, a signal from each of the two sub-sampling factors, wherein the temporally sampling comprises one of:

sub-Nyquist sampling using the two sub-sampling factors ($d_1$ and $d_2$) which are co-primes; and delaying the pulse compressed signal at one of the two sub-sampling factors and performing the sub-Nyquist sampling, using a sub-sampling factor $d_3$ on (i) the delayed pulse compressed signal, wherein an associated delay factor ($C_1$) is not a multiple of the sub-sampling factor $d_3$ and (ii) the pulse compressed signal, the pulse compressed signal referred as FMCW Intermediate Frequency (IF) Signal $r_k(t)$ and corresponding delayed version are sampled at same rate using same sub-sampling factor $d_3$, and $C_1$ and $d_3$ need to satisfy conditions including $C_1$ is an integer, $C_1 \neq nd_2$, where n is an integer, for $d_3$, $C_1=1$ is valid, and only one clock is sufficient, since the sub-Nyquist sampling is performed at same rate, and absence of common measurements between the sub-Nyquist sampler's output and absence of redundancy that increases number of measurements;

constructing a dictionary H based on the temporally compressed sampled signals, wherein the step of constructing a dictionary H based on the sampled signals comprises one of (i) a union of measurement matrices $H_{d_1}$ and $H_{d_2}$ corresponding to the two sub-sampling factors $d_1$ and $d_2$ respectively, wherein N denote number of time samples, the dictionary $H=[H_{d_1}, H_{d_2}]^T$, where $H_{d_p}$ is a NK×L dimension matrix, whose $(u,w)^{th}$ atom is expressed as:

$$\left[H_{d_p}\right]_{u,w} = e^{-i\left(\omega_0 \tau_u(x_w) + 2\alpha d_p w n \tau_u(x_w) - \alpha\tau_u(x_w)^2\right)}$$

where $\tau_u(x_w)=2R_u(x_u)/c$, which represents a range from $u^{th}$ radar location to $$x_w^{th}$$

position in an image space, and (ii) a union of measurement matrices $H_{d_3}$ and $H_{d_{3\text{-}delayed}}$ corresponding to the sub-sampling factor $d_3$ on the pulse compressed signal and the delayed pulse compressed signal respectively; and wherein each atom of the dictionary H is computed based on a time delay;

formulating an optimization problem comprising the temporally compressed sampled signals, the constructed dictionary and a regularizer;

estimating a plurality of reflectivity coefficients of the region of interest by solving the formulated optimization problem, wherein $\rho=[\rho(x_1), \rho(x_2), \ldots \rho(x_L)]^T$ denotes a vector of the plurality of reflectivity coefficients, and rows of $H_{d_1}$ and $H_{d_2}$ at row position, $a\text{LCM}(d_1,d_2)$, $a \in \mathbb{Z}$ are duplicates, wherein duplicate rows and corresponding measurements are removed by retaining only one row and the corresponding measurement; and imaging the region of interest by reconstructing a Synthetic Aperture Radar (SAR) image thereof, based on the temporally compressed sampled signals, using the estimated plurality of reflectivity coefficients, wherein the sub-Nyquist sampling employs architecture with a hardware, using the dictionary based reconstruction approach, wherein the solving of the formulated optimization problem using an Alternating Direction Method of Multipliers (ADMM) approach is applied in the field of remote sensing.

10. The one or more non-transitory machine-readable information storage mediums of claim 9, wherein the one or more instructions which when executed by the one or more hardware processors further cause constructing a dictionary H based on the sampled signals by the union of measurement matrices $H_{d_3}$ and $H_{d_{3\text{-}delayed}}$ corresponding to the sub-sampling factor $d_3$ on the pulse compressed signal and the delayed pulse compressed signal, wherein dictionary $H=[H_{d_3}, H_{(d_3\text{-}delayed)}]^T$ wherein for $d_3$, $$r_k^{(d_3)}(n) = \sum_{l=1}^{L} \rho(x_l) e^{-i\left(\omega_0 \tau(x_l) + 2\alpha d_3 n \tau(x_l) - \alpha \tau(x_l)^2\right)} + \eta_k^{d_3}(n) \text{ and}$$

$$\left[H_{d_3}\right]_{u,w} = e^{-i\left(\omega_0 \tau_u(x_w) + 2\alpha d_3 w n \tau_u(x_w) - \alpha \tau_u(x_w)^2\right)}$$

for $d_{3\text{-}delayed}$, the pulse compressed signal is delayed by $C_1$, $$r_k^{(d_{3-delayed})}(n - C_1) = \sum_{l=1}^{L} \rho(x_l) e^{-i\left(\omega_0 \tau(x_l) + 2\alpha\left(d_{3-delayed}\right)(n - C_1)\tau(x_l) - \alpha \tau(x_l)^2\right)} + \eta_k^{(d_{3-delayed})}(n - C_1) \text{ and}$$

$$\left[H_{(d_{3-delayed})}\right]_{u,w} = e^{-i\left(\omega_0 \tau_u(x_v) + 2\alpha\left(d_{3-delayed}\right) w (n - C_1)\tau_u(x_w) - \alpha \tau_u(x_w)^2\right)}.$$

11. The one or more non-transitory machine-readable information storage mediums of claim 9, wherein the formulated optimization problem is represented as:

$$\hat{\rho} = \underset{\rho}{\operatorname{argmin}} |r^{comp} - H\rho|_2 + \lambda R(\rho)$$

where $R(\rho)$ is the regularizer on the plurality of reflectivity coefficients $\rho$, $\lambda$ is a penalty term which controls the amount of regularization and $r^{comp}=\text{vec}\{r\}$, where r is a collection of temporally compressed sampled signals.

12. The one or more non-transitory machine-readable information storage mediums of claim 11, wherein the one or more instructions which when executed by the one or more hardware processors further cause solving the formulated optimization problem using the ADMM, and a proxy variable v is introduced and the formulated optimization problem is converted into a constrained optimization problem as:

$$\{\hat{\rho}, \hat{v}\} = \underset{\rho, v}{\operatorname{argmin}}\ D(\rho) + \lambda R(v)$$

subject to $\rho=v$ where $D(\rho)=|r^{comp}-H\rho|_2$ represents data fidelity.

* * * * *